(12) United States Patent
Choi et al.

(10) Patent No.: US 7,839,059 B2
(45) Date of Patent: Nov. 23, 2010

(54) INNER-FORCER MILLI-HEMISPHERICAL RESONATOR GYRO

(75) Inventors: Youngmin A. Choi, Agoura Hills, CA (US); David M. Rozelle, Woodland Hills, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 397 days.

(21) Appl. No.: 11/890,043

(22) Filed: Aug. 3, 2007

(65) Prior Publication Data

US 2009/0031832 A1 Feb. 5, 2009

(51) Int. Cl.
*H01L 41/09* (2006.01)
(52) U.S. Cl. ................................... 310/348
(58) Field of Classification Search ............ 310/348, 310/340, 344, 370–371, 367–368, 338, 309; 438/413.2; 73/504.12, 504.04, 504.13; 333/198; *H01L 41/09*
See application file for complete search history.

(56) References Cited

U.S. PATENT DOCUMENTS

| | | | | |
|---|---|---|---|---|
| 4,157,041 A * | 6/1979 | Loper et al. | ............... | 73/504.13 |
| 5,712,427 A * | 1/1998 | Matthews | ................. | 73/504.13 |
| 7,222,532 B2 * | 5/2007 | Choi | ......................... | 73/504.13 |
| 7,607,350 B2 * | 10/2009 | Choi | ......................... | 73/504.13 |
| 2006/0248953 A1 * | 11/2006 | Lynch et al. | ............. | 73/504.12 |

* cited by examiner

*Primary Examiner*—Walter Benson
*Assistant Examiner*—Karen Addison
(74) *Attorney, Agent, or Firm*—Carmen Patti Law Group, LLC

(57) ABSTRACT

The Inner-Forcer milli-Hemispherical Resonator Gyro (mHRG) is a small, low cost, high performance gyroscope. It may have an extremely simplified design, with in one embodiment of the present method and apparatus only five major parts total, with most parts filling multiple functions. The method and apparatus in one embodiment may have: a resonator; and a body operatively coupled to the resonator, the unitary body integrally having electrodes, an electrode support unit, a weld ring and a plurality of electrically conductive pins, the plurality of electrodes operatively coupled to the electrically conductive pins.

24 Claims, 7 Drawing Sheets

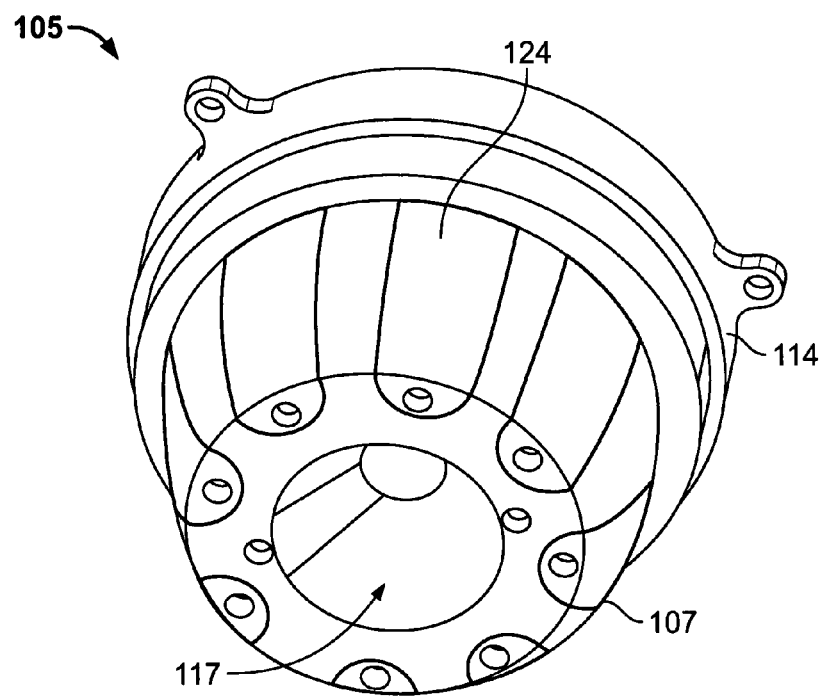
FIG. 7
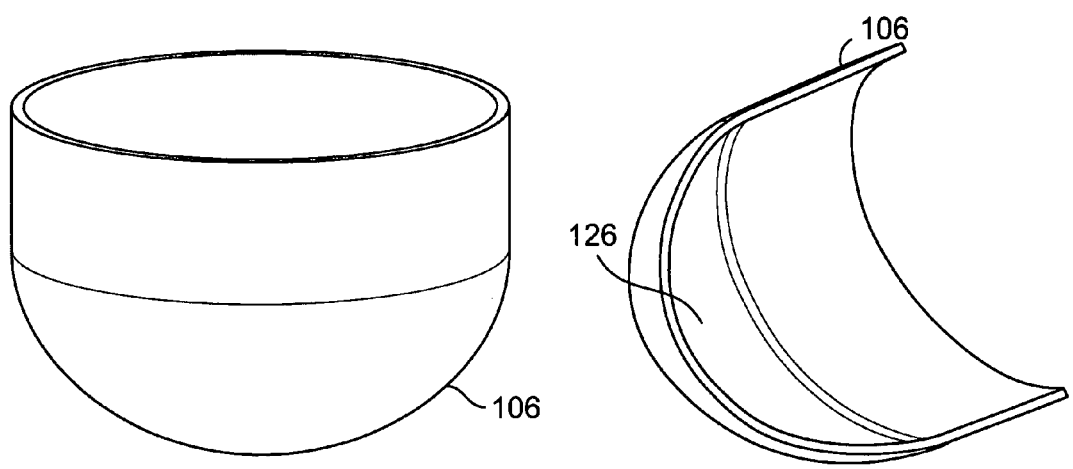
FIG. 8   FIG. 9

INNER-FORCER MILLI-HEMISPHERICAL RESONATOR GYRO

TECHNICAL FIELD

The invention relates generally to hemispherical resonator gyros (referred to as HRGs) and, more particularly, to inner forcer hemispherical resonator gyros.

BACKGROUND

Hemispherical resonator gyros are known and are often used as rate sensors as part of inertial reference units (IRU's) in spacecraft and as part of inertial measurement units (IMU's) in aircraft and land vehicles. Much like a wine glass which rings when it is struck, the hemispherical-resonator gyro is a precisely machined glass hemispherical shell mounted within a protective case that is induced to ring through the use of electrostatic forces. A rotation of the vehicle containing the gyro will cause the location of the ringing pattern to rotate within its case. The angle of the pattern rotation can then be detected within the gyro to determine the rotation of the vehicle. This rotation information is then provided to a processor which uses it to determine the orientation of the vehicle in inertial space. The ringing vibration is so minute that it creates virtually no internal stress and fatigue effects in the gyro, leading to its unmatched reliability.

Miniaturization of components is an important issue for many applications, and is especially important for spacecraft and other vehicles where size and weight are at a premium. Ideally the miniaturization of a component should be accomplished with no degradation in performance.

Thus, there is a need for miniaturization of hemispherical-resonator gyros without loss of performance.

SUMMARY

One embodiment of the present method and apparatus encompasses an apparatus. The apparatus may comprise: a resonator; and a body operatively coupled to the resonator, the unitary body integrally having an electrode support unit, a plurality of electrodes, a weld ring and a plurality of electrically conductive pins, the plurality of electrically conductive pins operatively coupled to the electrodes, a cap integrally having a getter, a detachable buffer circuit card assembly, and a buffer cover integrally having a mounting ring.

Another embodiment of the present method and apparatus encompasses a method. The method may comprise: metallization of a resonator; balancing of the resonator; metallization of a body to form electrodes thereon; alignment of the resonator relative to the electrodes on the body; bonding the resonator to the body; the activating of the getter; the welding of the cap to the body; evacuating and sealing; and mounting of a buffer and cover to the body.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

FIG. 7 is another perspective view of a body that may be used in the FIG. 1 mHRG;

FIG. 8 is a perspective view of a cap that may be used in the FIG. 1 mHRG;

FIG. 9 is a cut away perspective view of a cap that may be used in the FIG. 1 mHRG.

DETAILED DESCRIPTION

The Inner-Forcer milli-Hemispherical Resonator Gyro (mHRG) is a new small, low cost, high performance HRG that may be used, for example, in high precision hand-held targeting devices for foot soldiers. It may have an extremely simplified design, with in one embodiment of the present method and apparatus only five major parts total, with most parts filling multiple functions. In such an embodiment the parts include; a resonator with a metallized inner surface; a body having combined electrode support, electrodes, weld ring and a plurality of electrically conductive pins, such as hermetic feed-throughs; a cap having a getter that serves to complete a vacuum seal around the resonator and an absorber of residual gas in the cavity surrounding the resonator; a cover with a mounting ring that protects electronics and provides a method for mounting the gyro while providing flex in the attachment for taking up thermal expansion mismatch between block and gyro materials; and a buffer with electrical circuitry to readout pickoff signals and deliver forcer voltages to the gyro.

The mHRG may have the performance and reliability of the proven hemispherical resonator gyro design used in many critical space applications for pointing and stabilization functions. Even though embodiments of the present method and apparatus may be significantly smaller in size as compared to typical HRG sensors, the mHRG has unique self-calibration capability and ensures consistent performance in rugged operational environment.

The typical HRG has extremely low rate noise, low power operation and small size and weight. Further size and weight reductions are enabled by the mHRG through implementation of a system mechanization that uses only eight internal electrodes, having them provide both pickoff and forcing functions (referred to as "inner-forcer"). This eliminates the need for the 32 external electrodes now used on the typical HRGs.

The maximum flex amplitude of the resonator in the mHRG is read by a pick off electrode. A force must be imposed on the resonator to make it flex, and this is accomplished by the forcer electrode. During operation electrostatic forces occur between the electrodes on the body and the resonator which has a metallized surface. In this embodiment four of the electrodes are used as forcer electrodes and the other four of the electrodes are used as pick off electrodes.

Figure 1:
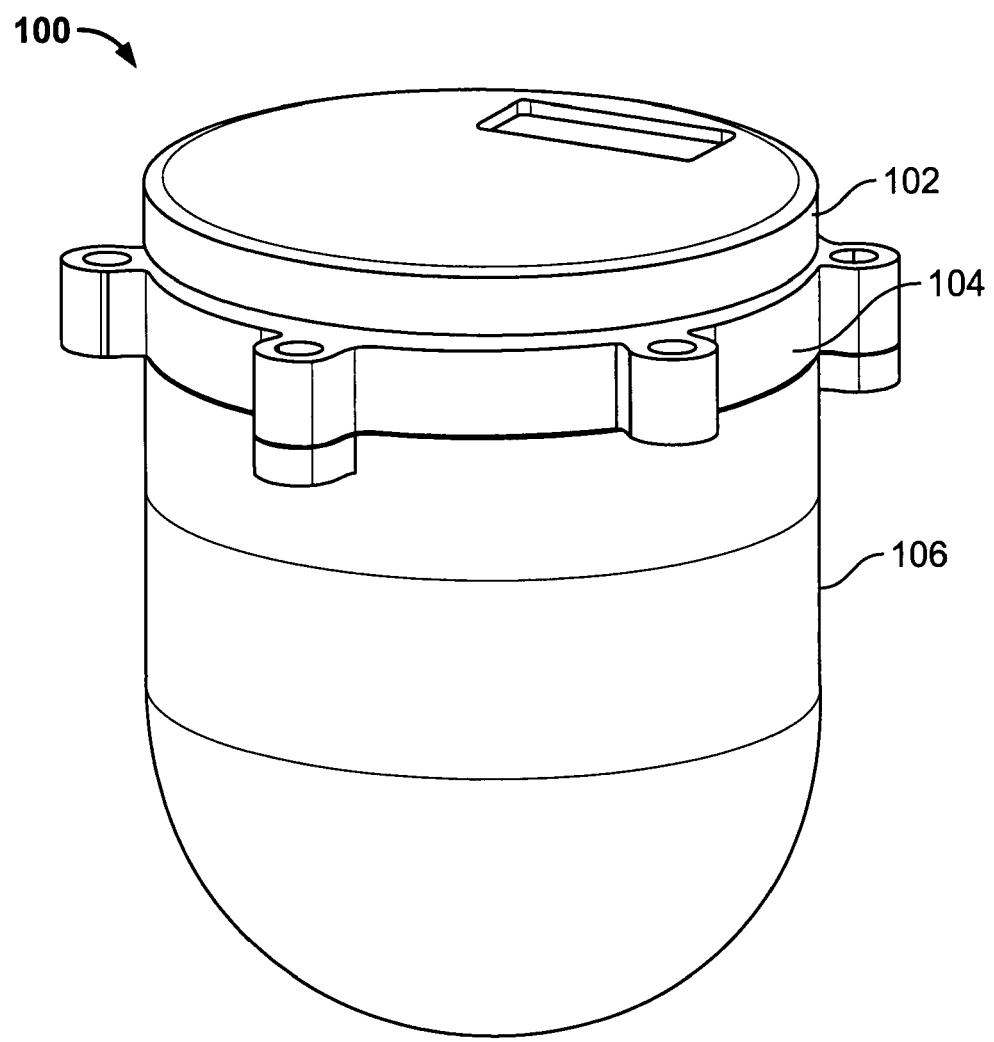
FIG. 1 depicts one embodiment of the milli-HRG (mHRG) according to the present method and apparatus.
Figure 2:
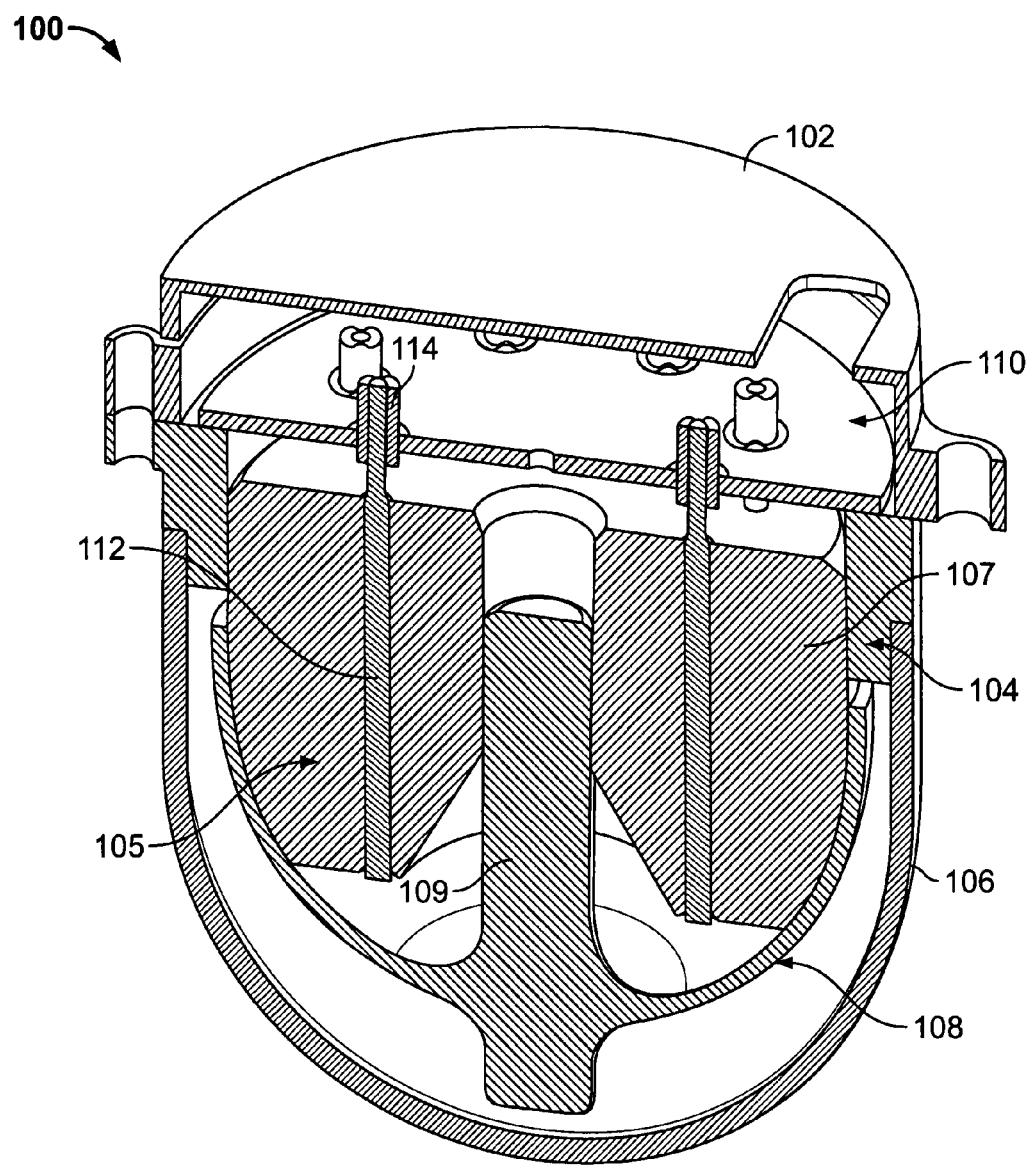
FIG. 2 depicts a cut away view of the FIG. 1 mHRG.
Figure 3:
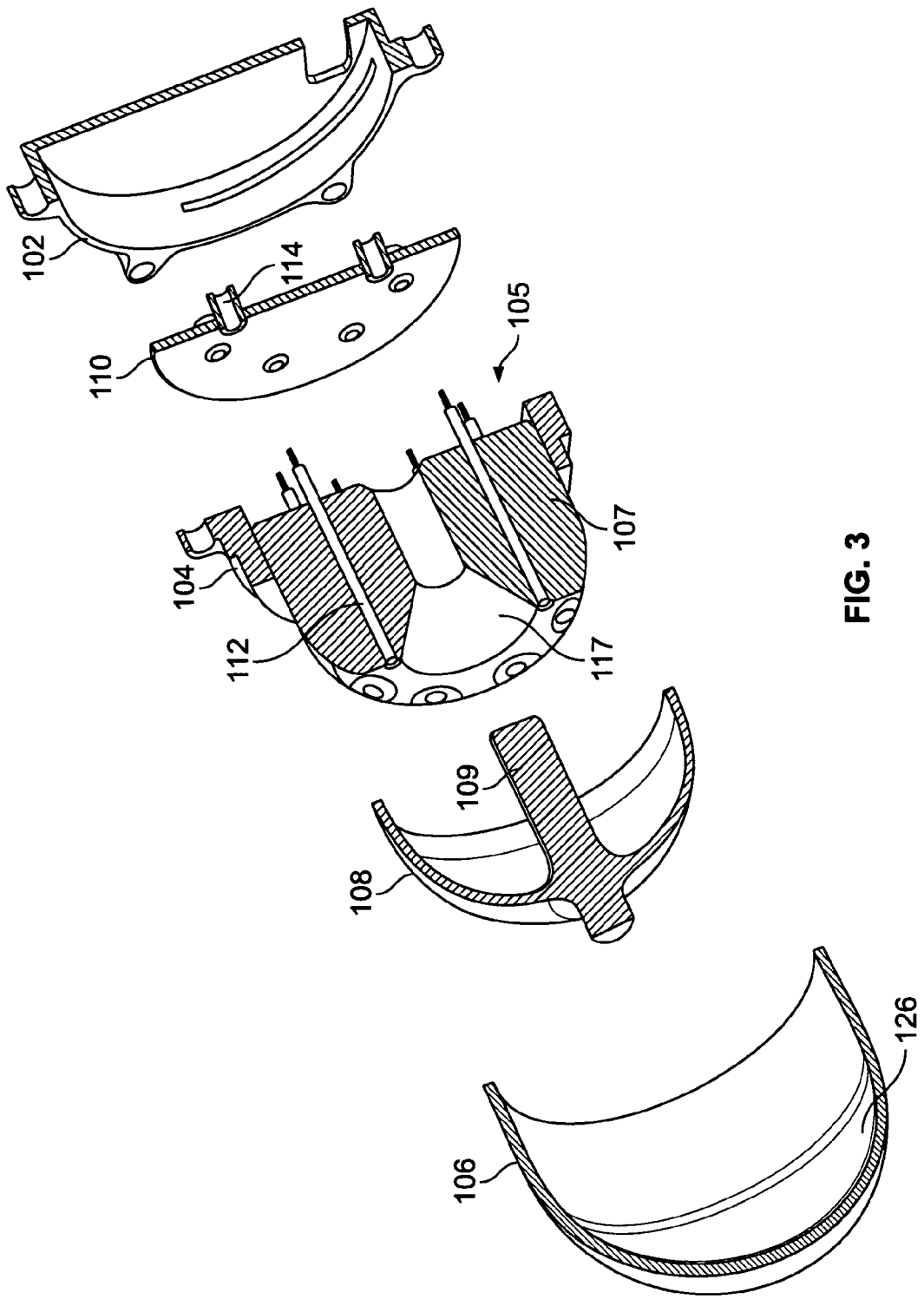
FIG. 3 is an exploded cut away view of the FIG. 1 mHRG.
Figure 4:
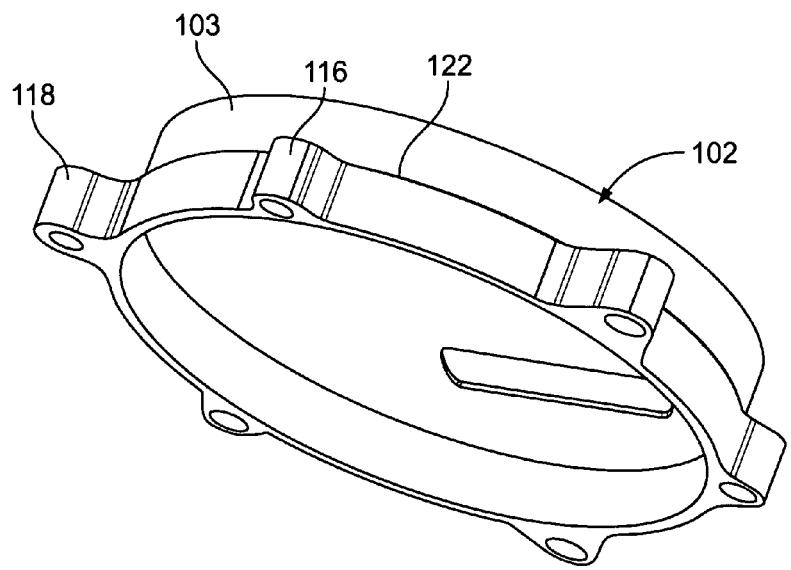
FIG. 4 is a perspective view of a cover that may be used in the FIG. 1 mHRG.
Figure 5:
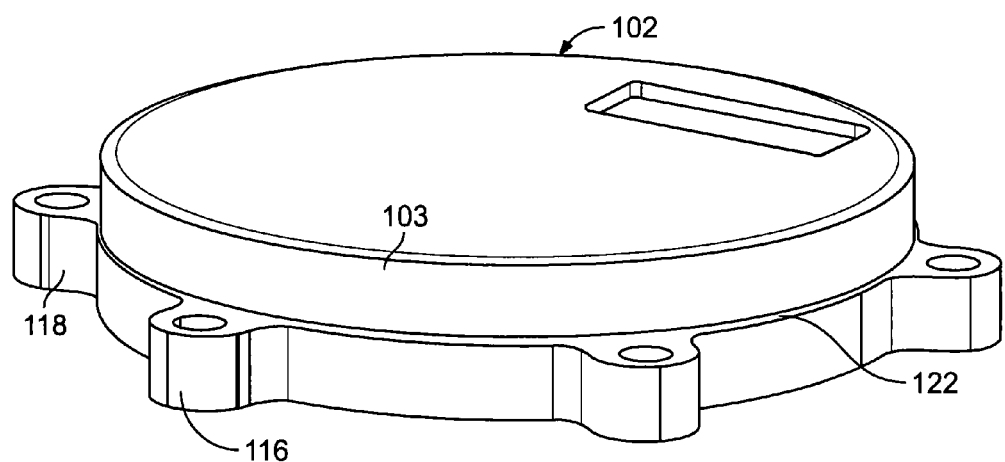
FIG. 5 is another perspective view of a cover that may be used in the FIG. 1 mHRG.
Figure 6:
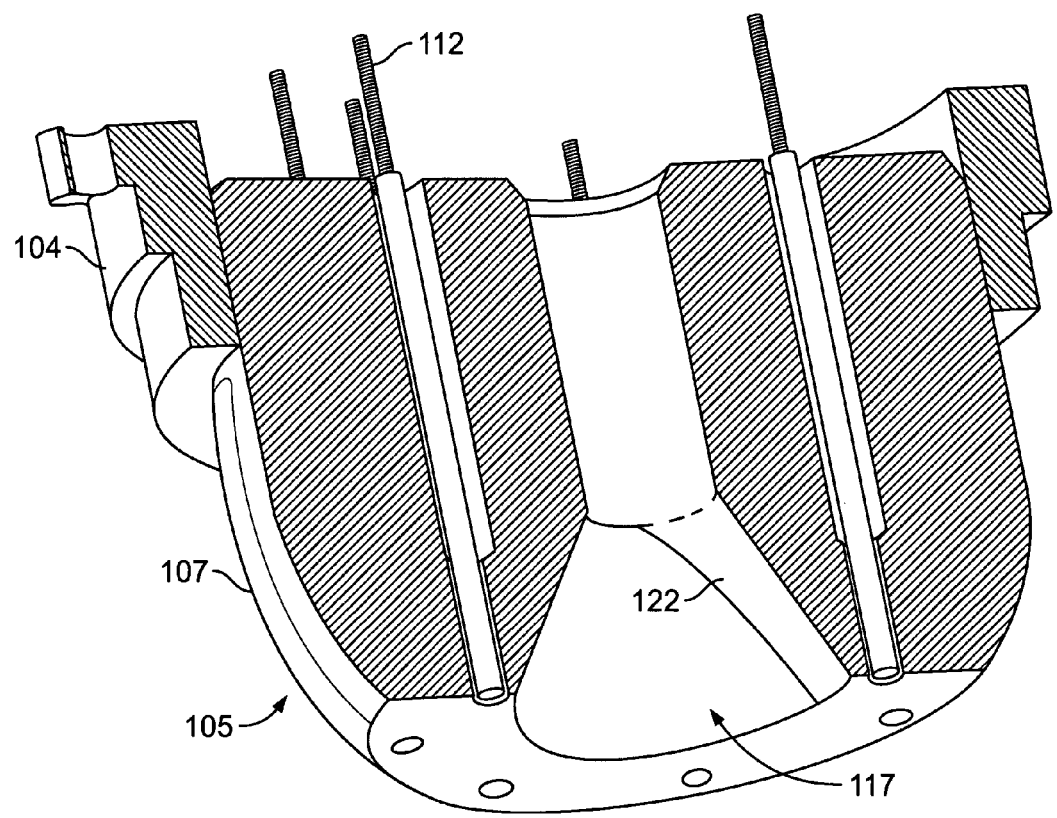
FIG. 6 is a cut away perspective view of a body that may be used in the FIG. 1 mHRG.
Figure 10:
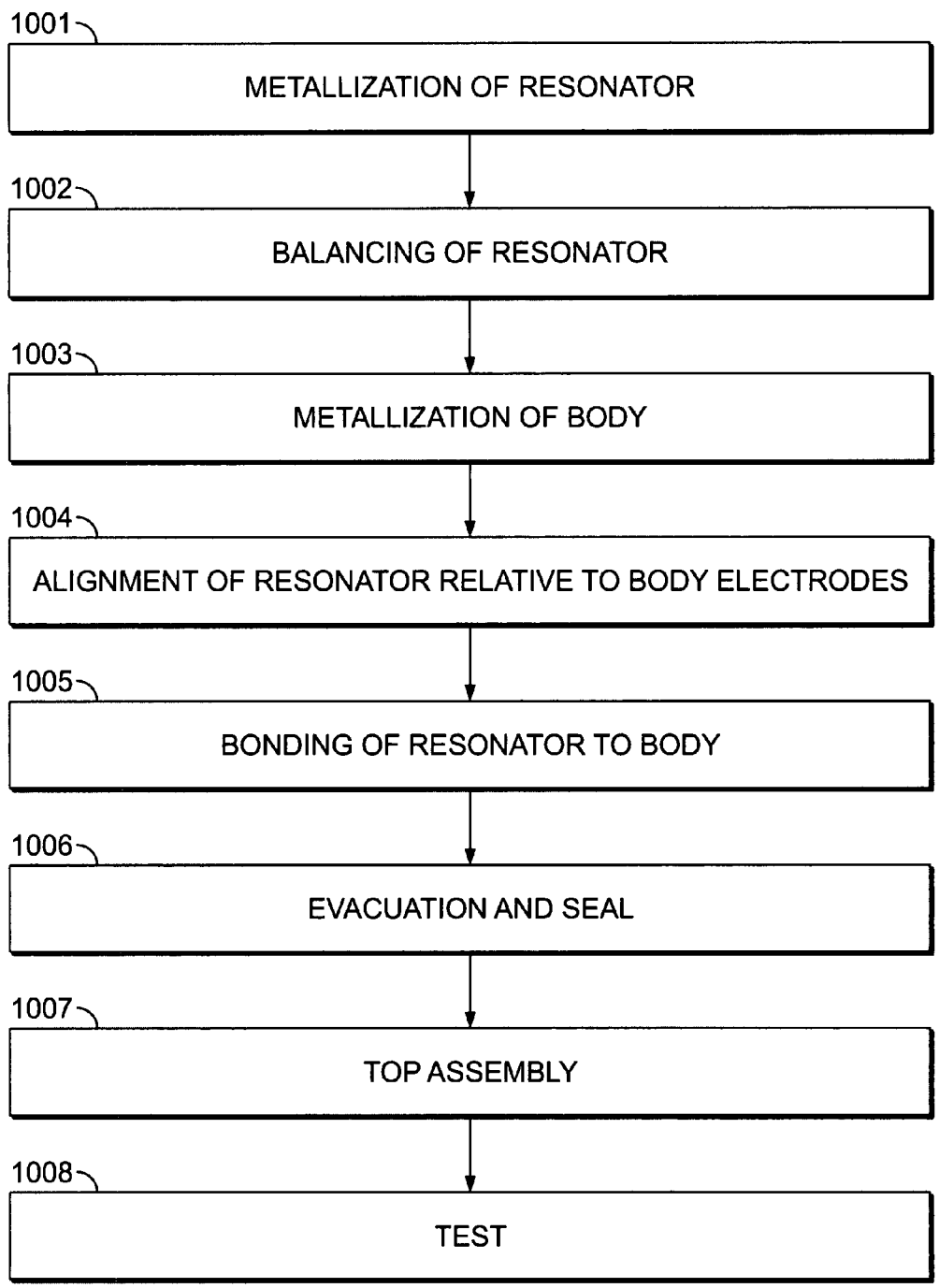
FIG. 10 is flow diagram of an assembly of the FIG. 1 mHRG.

FIG. 1 depicts one embodiment of the mHRG according to the present method and apparatus. FIG. 2 depicts a cut away view of the FIG. 1 mHRG, and FIG. 3 is an exploded cut away view of the FIG. 1 mHRG. FIG. 4 is a perspective view of a cover that may be used in the FIG. 1 mHRG, and FIG. 5 is another perspective view of a cover that may be used in the FIG. 1 mHRG. FIG. 6 is a cut away perspective view of a body that may be used in the FIG. 1 mHRG, and FIG. 7 is another perspective view of a body that may be used in the FIG. 1 mHRG. FIG. 8 is a perspective view of a cap that may be used in the FIG. 1 mHRG, and FIG. 9 is a cut away perspective view of a cap that may be used in the FIG. 1 mHRG. FIG. 10 is flow diagram of an assembly of the FIG. 1 mHRG. In the various figures like elements are identified by like reference numerals.

A mHRG 100 according to an embodiment of the present method and apparatus may have a resonator 108 with a stem 109; a body 105 having electrodes 124, electrode support structure 107, weld ring 104, hermetic feed-throughs or electrically conductive pins 112 and a resonator electrical connection 122, between the electrically conductive pins 112, and the resonator stem 109; a cap 106 that serves to complete a vacuum seal around the resonator 108 having an integral getter 126; a cover 102 with a mounting ring that protects electronics, provides a method for mounting the gyro and provides flex for taking up thermal expansion mismatch between block and gyro materials; and a buffer 110 with electrical circuitry to read out pickoff signals and deliver forcer voltages to the gyro.

The resonator 108 may have, for example, a 30 mm diameter hemispherical design. Reduced diameter resonators (i.e. 15 mm) may also be utilized according to the present method and apparatus if a large reduction in size is desired. While the structure of the resonator hasn't changed from the design used in earlier gyros, the processing steps have been reduced. With no outer forcers, the need to metallize the exterior of the resonator is eliminated. It also eliminates the need for the second stage of the balancing process that currently is performed after an exterior metallization.

In one embodiment according to the present method and apparatus the electrode support structure 107 may be constructed from a molded machinable-ceramic part. The electrode support structure 107 may be molded, then after firing, machined to slightly oversized dimensions. This may then be fired a second time which results in a very strong, hard material that will only require minimal touch-up machining for completion. Once constructed the feed-through pins 112 and the weld ring 104 may be brazed onto the piece resulting in a precision part that may be hermetically sealed to maintain the hard vacuum required by the mHRG 100.

The body 105 may have; an electrode support structure 107 that is formed from a machinable ceramic material, a plurality of electrically conductive pins 112 that extend through the body 105 at predetermined locations, a weld ring 104, a plurality of electrodes 124, and a resonator electrical connection 122. The electrodes 124 and resonator electrical connection 122, may be deposited on the electrode support structure 107 in a predetermined configuration. The plurality of electrodes 124 and resonator electrical connection 122, also establish respective electrical connections with the plurality of electrically conductive pins 112. The electrically conductive pins 112 and associated electrodes 124 provide power to the gyro, read outs from the gyro, etc. The electrically conductive pins 112 and resonator electrical connection 122 provide power to the gyro resonator. The electrically conductive pins 112 may be hermetically sealed in the body 107. The weld ring 104 may be formed from materials such as a high strength aluminum, Kovar or stainless steel, and is attached to the outer diameter of the electrode support structure 107.

The pins 112 may establish electrical conductivity with electronic circuitry (not shown) by engaging, for example, pin sockets 114 in a buffer 110. The electronic circuitry may be located on the buffer 110 on a side opposed from the electrode support structure 107. The electrodes 124 may extend along the side of the electrode support structure 107 and over the top of the electrode support structure 107 to connect with the pins 112. In the depicted embodiment the electrodes 124 may have a substantially wedge shape on the side of the body 107, and are distributed around the electrode support structure 107. In the depicted embodiment the resonator electrical connection 122 may extend along the inner surface 117 of the electrode support structure 107 and over the top of the electrode support structure 107 to connect with the pins 112.

The cap 106 may have a getter 126 that results in a composite part. The cap function may be to complete the vacuum cavity enclosing the resonator 108. The cap 106 may be welded onto the weld ring 104 while under a vacuum such that, when the hermetic weld completely encircles the cylinder, the vacuum cavity is sealed thereby eliminating the need for a separate evacuation port. The getter 126 may be a heat activated type that may be deposited in the cap 106. In one example of a getter, before material used for the getter will work as a getter, it may be heat activated to 450° C., and then sealed into the gyro. The getter 126 may be activated immediately before the process of welding the cap 106 to the weld ring 104.

The cover 102 may function as the protection of the electronics on the buffer 110 under it. The side 103 of the cover 102 may be cut to provide a spring mount that will allow the gyro to thermally expand independently from the system platform. This prevents the thermal stress from causing losses in the resonator 108 during operation.

The cover 102 in one embodiment of the present method and apparatus may be formed of aluminum, Kovar or stainless steel. The cover 102 may be attached to the weld ring 104 of the body 105 by, for example, screws or bolts (not shown) that may extend through a first set of feet 116 on an outer side 103 of the cover 102. A second set of feet 118 on the outer side 103 of the cover 102 may receive screws or bolts, for example, that secure the gyro to a platform (not shown).

In the depicted embodiment the first and second feet 116, 118 alternate around the cover 102. The cover 102 may also have a compliant ring 122 in the outer side 103 of the cover 102. The compliant ring 122 being formed by a series of slots in the outer side 103 of the cover 102 that extends between the feet 118 and the adjacent set of feet 118. In the depicted embodiment the compliant ring 122 has three slots that are located adjacent the first set of three feet 118 for securing the cover 102 to the weld ring 104. The compliant ring 122 is thus an integral structure with the cover 102. The compliant ring 122 allows for flexing due to expansion of the platform relative to the gyro caused, for example, by heat.

The buffer 110 may be a buffer circuit card assembly that locates the electronic circuitry necessary to read the electrode capacitances in the gyro. These are low level signals that would be susceptible to electrical interference if routed from gyro to system boards. It also provides the signal routing for forcer signals necessary to control the gyro. The buffer 110 may have a plurality of zero insertion force sockets or metallized pads 114 that receive and establish electrical connection with the pins 112 of the body 105.

For example, the electronic circuitry may have buffers on the pickoffs where the voltage that occurs across the electrodes is read out through an op amp. These voltages may be amplified and sent out to the system electronics. The system electronics may have analog to digital converters that are operatively coupled to a digital signal processor to convert the read out measurements to measurements of where and at what amplitude the resonator is flexing. A control algorithm then sends forcer signals out to the forcer electrodes to keep the flexing of the resonator in a predetermined condition.

In general, a gyro is a sensor that gives information about angular rate or how fast it's turning. Because the gyro's output indicates how fast an object is turning, the output signal must be integrated or added up over time. Integration involves periodically sampling the gyro with an analog to digital converter, multiplying the resulting number by the number of seconds between samples and adding it to a static variable that keeps track of the angle.

Gyro bias offset, also known as the zero rate output, is the forcer signal present when the gyro is not rotating about its sensitive axis. For example, a gyros may have a bias offset of about 0.5°/hr. Gyro output measurements above the bias offset indicate rotation in one direction, e.g., clockwise, while output measurements below the bias offset indicate rotation in the opposite direction, e.g., counter-clockwise.

FIG. 10 is flow diagram of an assembly of the FIG. 1 mHRG 100. The build process for the mHRG 100 is significantly simplified according to the present method. The overall process may be broken down into just 8 steps: Metallization of Resonator (1001), Balancing of Resonator (1002), Metallization of Body (1003), Alignment of Resonator relative to Body Electrodes (1004), Bonding of Resonator to Body (1005), Evacuation and Seal (1006) (includes Getter Firing, Bake Out and Cap to Body Welding), Top Assembly (1007) (includes mounting of buffer and cover), and Test (1008).

It is to be understood that the parts of the gyro may have many different shapes, and the depicted shapes are only one embodiment. For example, the cap may be cylindrical rather than having a domed top.

The gyro according to the present method and apparatus is less expensive to build and has less weight than prior art gyros.

The present apparatus in one example may comprise a plurality of components such as one or more of electronic components, hardware components, and computer software components. A number of such components may be combined or divided in the apparatus.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

We claim:

1. An apparatus, comprising:
    a resonator with a metallized inner surface;
    a body operatively coupled to the resonator;
    a cap operatively coupled to the body such that the cap and body form a vacuum sealed chamber that contains the resonator;
    a buffer with electrical circuitry that provides, via the body, readout pickoff signals and forcer voltages for interfacing with the resonator; and
    a cover operatively coupled to the body such that the cover and the body form a space that contains the electronics;
    wherein the body functions to support the resonator and to convey the readout pickoff signals and forcer voltages between the electronics and the resonator.

2. The apparatus according to claim 1, wherein the body has a substantially central aperture, and wherein the resonator has a stein that is operatively receivable by the substantially central aperture in the body.

3. The apparatus according to claim 1, wherein the body has a plurality of electrodes, an electrode support unit, a weld ring, a plurality of electrically conductive pins and a resonator electrical connection.

4. The apparatus according to claim 3, wherein the electrodes are respectively operatively coupled to the electrically conductive pins.

5. The apparatus according to claim 3, wherein the weld ring is operatively coupled to an outer diameter of the electrode support unit.

6. The apparatus according to claim 3, wherein the plurality of electrodes are deposited on a surface of the electrode support unit in a predetermined pattern.

7. The apparatus according to claim 3, wherein the plurality of pins are hermetic feed-throughs.

8. The apparatus according to claim 1, wherein the cap has a getter deposited on an inner surface thereof.

9. The apparatus according to claim 8, wherein the getter is activated by heat before the sealing of the cap to the body.

10. The apparatus according to claim 1, wherein the cover provides flex for taking up mismatch between platform and gyro materials due to temperature.

11. The apparatus according to claim 3, wherein the body is formed from a molded machinable ceramic part.

12. The apparatus according to claim 11, wherein the electrically conductive pins and the weld ring are coupled onto the electrode support unit resulting in a precision body that is hermetically sealed to maintain a hard vacuum.

13. An apparatus, comprising:
    a resonator;
    a body operatively coupled to the resonator, the unitary body integrally having electrodes, an electrode support unit, a weld ring, a plurality of electrically conductive pins, the plurality of electrodes operatively coupled to the electrically conductive pins, and a resonator electrical connection operatively coupled to an electrically conductive pin;
    a buffer with electrical circuitry that provides, via the body, readout pickoff signals and forcer voltages for interfacing with the resonator; and
    a cover operatively coupled to the body such that the cover and the body form a space that contains the electronics.

14. The apparatus according to claim 13, wherein the apparatus further comprises:
    a cap operatively coupled to the body such that the cap and body form a vacuum sealed chamber that contains the resonator; and
    wherein the body functions to support the resonator and to convey the readout pickoff signals and forcer voltages between the electronics and the resonator.

15. The apparatus according to claim 14, wherein the electrode support unit has a substantially central aperture, and wherein the resonator has a stem that is operatively receivable by the substantially central aperture in the electrode support unit.

16. The apparatus according to claim 15, wherein the electrodes are respectively operatively coupled to the electrically conductive pins.

17. The apparatus according to claim 14, wherein the weld ring is operatively coupled to an outer diameter of the electrode support unit.

18. The apparatus according to claim 14, wherein the plurality of electrodes are deposited on a surface of the electrode support unit in a predetermined pattern.

19. The apparatus according to claim 14, wherein the plurality of pins are hermetic feed-throughs.

20. The apparatus according to claim 14, wherein the cap has a getter on an inner surface thereof.

21. The apparatus according to claim 20, wherein the getter is activated by heat before the sealing of the cap to the electrode support unit.

22. The apparatus according to claim 14, wherein the cover provides flex for taking up mismatch between platform and gyro materials due to temperature.

23. The apparatus according to claim 14, wherein the electrode support unit is formed from a molded machinable ceramic part.

24. The apparatus according to claim 23, wherein the electrically conductive pins and the weld ring are coupled onto the electrode support unit resulting in a precision body that is hermetically sealed to maintain a hard vacuum.

* * * * *